(12) United States Patent
Maehara

(10) Patent No.: US 6,290,036 B1
(45) Date of Patent: Sep. 18, 2001

(54) DRUM BRAKE DEVICE

(75) Inventor: Toshifumi Maehara, Tokyo (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 0 days.

(21) Appl. No.: 09/309,882

(22) Filed: May 11, 1999

(30) Foreign Application Priority Data

May 12, 1998 (JP) .................................... 10-129087
Jul. 10, 1998 (JP) .................................... 10-195937

(51) Int. Cl.[7] .................................................. F16D 51/00
(52) U.S. Cl. ........................ 188/325; 188/328; 188/329
(58) Field of Search ................................. 188/325, 328, 188/75, 78, 327, 329, 330

(56) References Cited

U.S. PATENT DOCUMENTS

| 3,941,218 | * | 3/1976 | Torii ................................. 188/106 F |
| 4,286,504 | | 9/1981 | Carre et al. ............................ 91/517 |
| 4,374,554 | * | 2/1983 | Colpaert ........................... 188/106 A |
| 4,415,209 | * | 11/1983 | Schopper ............................. 303/9.73 |
| 4,449,757 | * | 5/1984 | Rath et al. ........................... 303/9.72 |
| 5,964,324 | * | 10/1999 | Maehara ............................... 188/325 |
| 6,059,077 | * | 5/2000 | Maehara ............................... 188/325 |
| 6,186,294 | * | 2/2001 | Maehara ............................... 188/325 |

FOREIGN PATENT DOCUMENTS

| 0837258 | * | 4/1998 | (EP) . |
| 837258A2 | | 4/1998 | (EP) . |
| 887570A2 | | 12/1998 | (EP) . |
| 59222627 | * | 12/1984 | (JP) . |
| 01055434 | * | 3/1989 | (JP) . |
| 11022756 | * | 1/1999 | (JP) . |
| 11303904 | * | 11/1999 | (JP) . |
| 11313903 | * | 11/1999 | (JP) . |

* cited by examiner

*Primary Examiner*—J. J. Swann
*Assistant Examiner*—David Divine
(74) *Attorney, Agent, or Firm*—Morgan, Lewis & Bockius LLP

(57) ABSTRACT

A drum brake device including, a pair of brake shoes, a wheel cylinder, anchor pins, and a control lever. The control lever is disposed between a wheel cylinder and a secondary shoe and has a structure that the flanges and are raised from both ends of a plate-like lever body. The first flange is formed at one end of the plate-like lever body and includes a piston contact portion. The second flange is formed at the other end thereof. The surface of the second flange, which faces an anchor pin, is used as an anchor contact portion, and the surface of the second flange, which faces the secondary shoe, is used as a shoe contact portion.

7 Claims, 5 Drawing Sheets

DRUM BRAKE DEVICE

BACKGROUND OF THE INVENTION

1. Field of the Invention

The present. invention relates to a drum brake device for vehicles. More particularly, the present invention relates to improvements of a control lever, interposed between a wheel cylinder and a brake shoe, for distributing an anchor counter force of the brake shoe to a control piston of a wheel cylinder and an anchor pin.

Furthermore, the present invention relates to a drum brake device which is able to stabilize a braking effect in both the forward and reverse rotation directions of a brake drum.

2. Description of the Related Art

Various types of drum brake devices have been used for braking vehicles and others. Generally, the drum brake device may be categorized into brake devices of the leading trailing type, the two-leading type and the duo-servo type depending on the layout of brake shoes disposed within and along the inner circumferential surface of a cylindrical brake drum.

The duo-servo drum brake device is constructed such that a pair of brake shoes, primary and secondary brake shoes, are oppositely disposed within a cylindrical brake drum, a wheel cylinder used for expanding the brake shoes is disposed between first opposed ends of the brake shoes, and the second opposed ends of the brake shoes are link-coupled to each other.

The primary shoe is arranged such that the input of the primary shoe when viewed in the forward rotation direction of the brake drum is used as a power input, the output of the primary shoe when viewed in the same direction is coupled to an adjuster and then the input of the secondary shoe. The output of the secondary shoe is brought into contact with an anchor portion mounted on a backing plate so that the anchor portion receives the anchor counter force acting on the primary and secondary shoes.

With such a structure, when the primary and secondary shoes are expanded into braking engagement with the inner circumferential surface of the rotary brake drum, an anchor counter force acting on the primary shoe is input to the secondary shoe, and the secondary shoe is pressed against the drum inner surface. Accordingly, both of the primary and secondary shoes function as a leading shoe. The duo-servo drum brake device produces a braking force at considerably high gain.

The drum brake device of the duo-servo type is superior in many points to the brake devices of the leading trailing type and the two-leading type. For example, the former brake device is capable of producing much higher braking force than the latter brake devices. Further, size reduction of the brake device is easier and the assembling of a parking brake mechanism into the brake device per se is easier than the latter ones.

However, one draw-back of the duo-servo drum brake device is its sensitivity to variations of the friction coefficients of the linings of the brake shoes. With this, the braking force produced is likely to be unstable. The market has longed for a decisive solution to this problem.

For this technical background, the applicant of the present patent application has already proposed a duo-servo drum brake device capable of stabilizing a braking force produced thereby. In the drum brake device, a wheel cylinder includes a drive piston, a control piston, and a control lever. The drive piston presses the brake shoes in accordance with a hydraulic pressure supplied to a pressure chamber. The control piston controls the supply of hydraulic pressure to the pressure chamber. The control lever is disposed between the wheel cylinder and one of the brake shoes, and distributes an anchor counter force received from the brake shoe to an anchor pin and the control piston.

In the brake device thus constructed, the anchor counter force is transmitted from the brake shoe through the control lever to the control piston, and then the control piston is operated by the received anchor counter force. When the anchor counter force is varied to reach a predetermined magnification ratio, the hydraulic pressure supply to the pressure chamber is stopped, thereby suppressing an increase of the anchor counter force. The duo-servo drum brake device succeeds in solving the problem of the duo-servo drum brake device producing high braking effect, viz., the braking force produced is unstable.

In this drum brake device, the control lever includes a piston contact portion for contact with the control piston, an anchor contact portion for contact with the anchor portion and a shoe contact portion for contact with the brake shoe. contact portions Manufacturing the requires extensive labor. The result is to increase the cost of making the contact, to increase the cost of making the control lever, and consequently to increase the cost of manufacturing the resultant brake device.

To secure a strength of the control lever high enough to withstand the anchor counter force, the size of the control lever needs to be increased correspondingly. The securing of a space occupied by the control lever of the increased size within the brake device places a limit on the layout of the wheel cylinder and the brake shoes within the brake device. Inefficient assembling work of the brake device results.

The use of the contact portions of the control lever entails an unstable operation accuracy of the control lever caused by the anchor counter force, and hence degradation of the control accuracy of the braking effect.

Furthermore, a braking force produced by the brake device of this type when the brake drum rotates in the forward direction is equal to that produced by the same when the drum rotates in the reverse direction. Therefore, in designing the drum brake device capable of producing a stable braking force, it is important that braking force stabilizing effect equally acts irrespective of the rotation directions of the brake drum.

SUMMARY OF THE INVENTION

Accordingly, a first object of the present invention is to provide a duo-servo drum brake device having a control lever, interposed between a wheel cylinder and a brake shoe, for distributing an anchor counter force of the brake shoe to a control piston of a wheel cylinder and an anchor pin, which the drum brake device is improved in that the cost to manufacture the control lever is reduced, the control lever is efficiently assembled into the brake device within a brake drum, and an operation accuracy of the control lever is stabilized, and a control accuracy of the braking effect is improved.

In addition, a second object of the present invention is to provide a drum brake device which can stabilize the braking effect in both the forward and reverse rotation directions of the brake drum.

The first object of the present invention is attained by a drum brake device having a pair of brake shoes, a wheel cylinder, anchor pins, and a control lever. The pair of brake shoes is oppositely disposed in an expandable fashion within an inner space of a brake drum. The wheel cylinder is disposed between first opposed ends of the brake shoes, the wheel including a) a drive piston for pressing the brake shoes in accordance with a hydraulic pressure supplied to a pressure chamber, and b) a control piston for controlling the supply of the hydraulic pressure to the pressure chamber. The anchor pins are provided in the wheel cylinder, for receiving anchor counter forces from the brake shoes. The control lever including a piston contact portion at one end thereof, an anchor contact portion at the other end, and a shoe contact portion at the mid position, the control lever distributing an anchor counter force to the anchor pin and the control piston. The control lever is constructed such that 1) one side of the first flange is raised from one end of a plate-like lever body, and one side of the first flange is used as the piston contact portion, 2) the second flange is raised from the other end of the lever body, and a surface of the second flange, which faces the anchor pin, is inwardly curved and used as the anchor contact portion, and another surface of the second flange, which faces the end of the secondary shoe, is used as the shoe contact portion, 3) wherein the control lever is disposed between the wheel cylinder and the secondary shoe.

In the drum brake device thus constructed, the control lever has such a simple structure that the flange which is provided at one end of the plate-like lever body and includes the piston contact portion and the flange which is provided at the other end of the lever body and includes the anchor contact portion and the shoe contact potion may be formed by raising those ends of the lever body by pressworking. Thus, the control lever may be formed by the pressworking suitable for mass production, not the cut working consuming much labor.

In case where the width of the lever body of the control lever is increased with the aim of increasing a mechanical strength of the control lever so as to withstand the anchor counter force, less limit is placed on the layout of the wheel cylinder and the brake shoes while partially overlapping with the secondary shoe, and the area occupied by the control lever partially overlaps with that by the brake shoe.

When the control lever receives at the shoe contact portion of the lever body an anchor counter force from the brake shoe, it turns about the anchor contact portion as a fulcrum, and the anchor counter force is transmitted, at a lever ratio, from its piston contact portion to the control piston.

When the control lever is turned by an anchor counter force received, if a distance between the anchor contact portion and the shoe contact portion is large, an angle at which the anchor counter force of the brake shoe acts on a point on the control lever varies in accordance with a quantity of a turn of the control lever. With the angle variation, the effective lever ration varies and hence, a quantity of the anchor counter force distributed to the control piston varies. This possibly makes the operation of the control lever (caused by the anchor counter force) unstable, and degrades the control accuracy of the braking effect.

Where the control lever is used, the distance between the anchor contact portion and the shoe contact portion is approximately thickness of the second flange, i.e., extremely short. With this technical feature, even if the force acting point angle varies with the quantity of turn of the control lever, the effective lever ratio is kept substantially constant, and the distributed anchor counter force is little varied in quantity.

The second object of the present invention is attained by a drum brake device having a pair of brake shoes oppositely disposed within an inner space of a brake drum, and a wheel cylinder for expanding the brake shoes. The drum brake device also has a cylinder body, drive pistons, and a valve. The cylinder body of the drum brake device including a) a control cylinder for slidably holding a pair of control pistons in a region between the brake shoes, and defining a control chamber for supplying a hydraulic pressure derived from a master cylinder in a region between the control pistons, b) a pair of drive cylinders, provided while communicating with the control cylinder, for slidably holding drive pistons provided outside the control pistons in a state that the drive pistons are slidable in a direction in which the brake shoes are confronted with each other, the drive cylinders defining input chambers in a region between the drive pistons and the control pistons, and c) a body-side passage for communicatively interconnecting the control chamber to the input chambers through a hydraulic-pressure guide hole passing through one of the control pistons. The drive pistons is abutted against the opposed brake shoes through the control levers, whereby an anchor counter force of each brake shoe is distributed at a predetermined lever ratio to an anchor pin and the drive pistons through the control lever. The valve is provided within the control chamber, closes the hydraulic-pressure guide hole when the control pistons are displaced to he control chamber by anchor counter forces applied from the drive pistons to the control pistons by the operating fluid of the input chambers, and a distance between the control pistons decreases to below a predetermined one.

When the drum brake device provided with the thus constructed wheel cylinder operates during the forward brake application, a hydraulic pressure is applied from the master cylinder to the input chambers via a route of the control chamber, the hydraulic-pressure guide hole and the body-side passage, and it causes the drive pistons of the drive cylinders to expand the paired brake shoes into engagement with the inner surface of the brake drum. In this case, the anchor counter force acting on the primary shoe is input to the input of the secondary shoe to press the secondary shoe against the inner surface of the secondary shoe. Therefore, the brake shoes serve as a leading shoe, and the brake device produces a braking force at considerably high gain.

During this forward brake application, the anchor counter force of the secondary shoe acts on the drive piston for the secondary shoe with the aid of the control lever. The anchor counter force acting on the drive piston acts on the control piston by the operating fluid of the input chamber. When the anchor counter force acting on the control piston increases to reach a predetermined magnification ratio and exceeds a hydraulic pressure within the control chamber. At this time, the control piston is displaced toward the control chamber to decrease the distance between the control pistons to below a predetermined one. Then, the valve body of the valve within the control chamber closes the hydraulic-pressure guide hole in the control piston to stop the supply of the hydraulic pressure from the control chamber to the input chamber. Therefore, the drum brake device stabilizes the braking effect while retaining a predetermined magnification ratio against the hydraulic pressure applied from the master cylinder.

Also during the reverse brake application, a hydraulic pressure is supplied from the master cylinder to one of the input chambers via the control chamber and the hydraulic-pressure guide hole, and to the other chamber via the control chamber and the hydraulic-pressure guide, and the body-side passage. The hydraulic pressure causes the drive pistons of the drive cylinders to expand the brake shoes into engagement with the inner surface of the brake drum. During the reverse brake application, the anchor counter force of the secondary shoe is input as an input power to the primary shoe, to thereby produce braking effect at high gain.

The drive pistons are brought into contact with the brake shoes by the control levers, respectively. Therefore, in the reverse brake mode, as in the forward brake mode, the anchor counter force of the primary shoe acts on the control piston by the drive piston and the operating fluid within the input chamber. When the anchor counter force acting on the control piston is increased to a predetermined magnification ratio and exceeds the hydraulic pressure within the control chamber which acts on the control piston, the control piston is displaced toward the control chamber and the distance between the control pistons is reduced to below a predetermined one. At this time, the valve body of the valve within the control chamber closes the hydraulic-pressure guide hole in the control piston to stop the supply of the hydraulic pressure from the control chamber to the input chamber. Therefore, the drum brake device stabilizes the braking effect while retaining a predetermined magnification ratio against the hydraulic pressure applied from the master cylinder.

In the embodiment, the control cylinder and the drive cylinders are aligned substantially in line. Those cylinders forms a piston accommodating hole, which passes through cylinder body while ranging from one end thereof to the other end. Therefore, the work to manufacture those cylinders is easy.

In the embodiment, the pair of control pistons are used for the control cylinder for the control of the anchor counter force during the forward brake application and that during the reverse brake application. The valve, located between the pair of control pistons is used in both forward and reverse brake modes, that is for both the forward and reverse brake applications. This contributes to reduction of the number of required component parts.

DETAILED DESCRIPTION OF THE PREFERRED EMBODIMENT

The first preferred embodiment of a drum brake device according to the present invention will be described with reference to the accompanying drawings of FIGS. 1 to 3.

Figure 1:
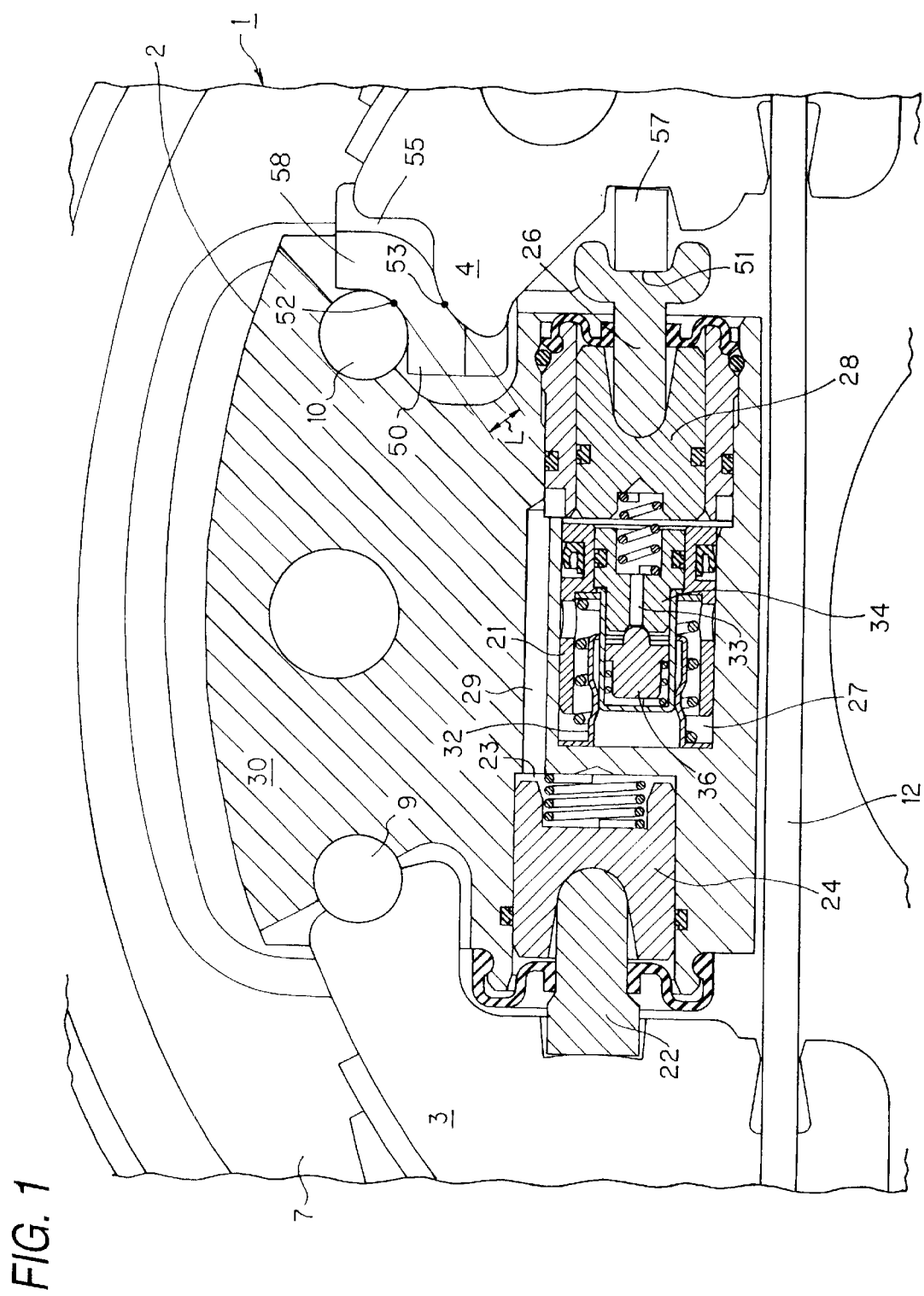
FIG. 1 is a front view showing a major portion of a drum brake device which is a first embodiment of the present invention.

FIG. 1 is a front view showing a major portion of a drum brake device which is an embodiment of the present invention. FIG. 2 is a perspective view showing a control lever of brake device shown in the FIG. 1 when viewed from the brake shoe. FIG. 3 is a perspective view control lever shown in FIG. 2 when viewed from the wheel cylinder.

The drum brake device 1 is a so-called duo-servo type. The drum brake device 1 is made up of a pair of brake shoes, a primary shoe 3 and a secondary shoe 4, a wheel cylinder 2, an adjuster (not shown), a backing plate 7, anchor pins 9 and 10, a control lever 50, and a strut 12. The brake shoes 3 and 4 are oppositely disposed between an inner space of a cylindrical brake drum. The wheel cylinder 2 is disposed between first opposed ends of the brake shoes 3 and 4 and expands those opposed brake shoes. The adjuster is disposed between the second opposed ends of the brake shoes 3 and 4, and serves as a link for transmitting a power output from the primary shoe 3 to the secondary shoe 4. The backing plate 7 supports those component parts thereon. The anchor pins 9 and 10 are fastened to both ends of the cylinder body of the wheel cylinder 2, respectively. The control lever 50 is disposed between the secondary shoe 4 and the wheel cylinder 2, and distributes an anchor counter force of the secondary shoe 4 to the anchor pin 10 and a control piston 21 provided in the wheel cylinder 2. The strut 12 forms a parking brake mechanism.

The wheel cylinder 2 is made up of a primary piston 24, a control chamber 27, a communicating passage 29, a secondary piston 28, the control piston 21, and a valve mechanism 32. The primary piston 24 is used for pressing the primary shoe 3 against the drum inner surface in accordance with a hydraulic pressure fed to a pressure chamber 23, with the aid of a piston rod 22 interposed between the primary shoe and the primary piston. The control chamber 27 receives a hydraulic pressure from a master cylinder (not shown). The communicating passage 29, which is formed in a cylinder body 30, introduces a hydraulic pressure from the control chamber 27 into the pressure chamber 23. The secondary piston 28 is used for pressing the secondary shoe 4 against the drum inner surface in accordance with a hydraulic pressure fed to the control chamber 27, with the aid of a piston rod 26 and the control lever 50. The control piston 21 is installed within the control chamber 27 such that within the control chamber 27, it is forwardly and backwardly movable together with the secondary piston 28 while being engaged with the secondary piston 28. The valve mechanism 32 controls the supply of a hydraulic pressure from the control chamber 27 to the pressure chamber 23 by the utilization of a displacing motion of the control piston 21.

The valve mechanism 32 includes a valve sheet 34 and a valve body 36. Structurally, the valve sheet 34 is put in the control piston 21 and has a fluid passage 33 formed at its central portion. Functionally, the valve sheet 34 displaces substantially in unison with the control piston 21 within the control chamber 27 to communicatively connect the control chamber 27 to the communicating passage 29. The valve body 36 is elastically supported at a predetermined position within the control chamber 27. When a displacement of the valve sheet 34 into the control chamber 27 reaches a predetermined quantity, the valve body 36 sits on the valve sheet 34 to close the fluid passage 33.

An anchor counter force is transmitted from the secondary shoe 4 to the secondary piston 28 via the control lever 50 and the piston rod 26. When this anchor counter force exceeds a hydraulic pressure within the control chamber 27 which urges the secondary piston 28 toward the secondary shoe 4, the anchor counter force displaces the secondary piston 28 into the control chamber 27. The control piston 21 and the valve sheet 34 follow the displacement of the secondary piston 28. When a displacement of the valve sheet 34 into the control chamber 27 reaches a predetermined quantity, the valve body 36 sits on the valve sheet 34 to close the fluid passage 33. As a result, the supply of the hydraulic pressure to the pressure chamber 23 is stopped.

Through the operation, a drive force of the primary piston 24, caused by the hydraulic pressure, is kept at a fixed value, thereby preventing further increase of the braking force and the anchor counter force. As a consequence, the drum brake device of the embodiment can stabilize a braking force (braking effect) while retaining high braking effect as the advantageous feature of the duo-servo drum brake device.

The control lever 50 includes a piston contact portion 51, an anchor contact portion 52, and a shoe contact portion 53. The piston contact portion 51 is located at one end of the control lever 50. It is coupled to the control piston 21 in a state that the piston rod :26 and the secondary piston 28 intervene therebetween. The anchor contact portion 52 is located at the other end of the control lever 50. It is in contact with the anchor pin 10 on the same side as of the control piston 21. The shoe contact portion 53 is located at the mid position of the control lever 50. It is brought into contact with the end of the secondary shoe 4, which is confronted with the control piston 21. The control lever 50 thus constructed distributes an anchor counter force of the secondary shoe 4 to the anchor pin 10 and the control piston 21.

Figure 2:
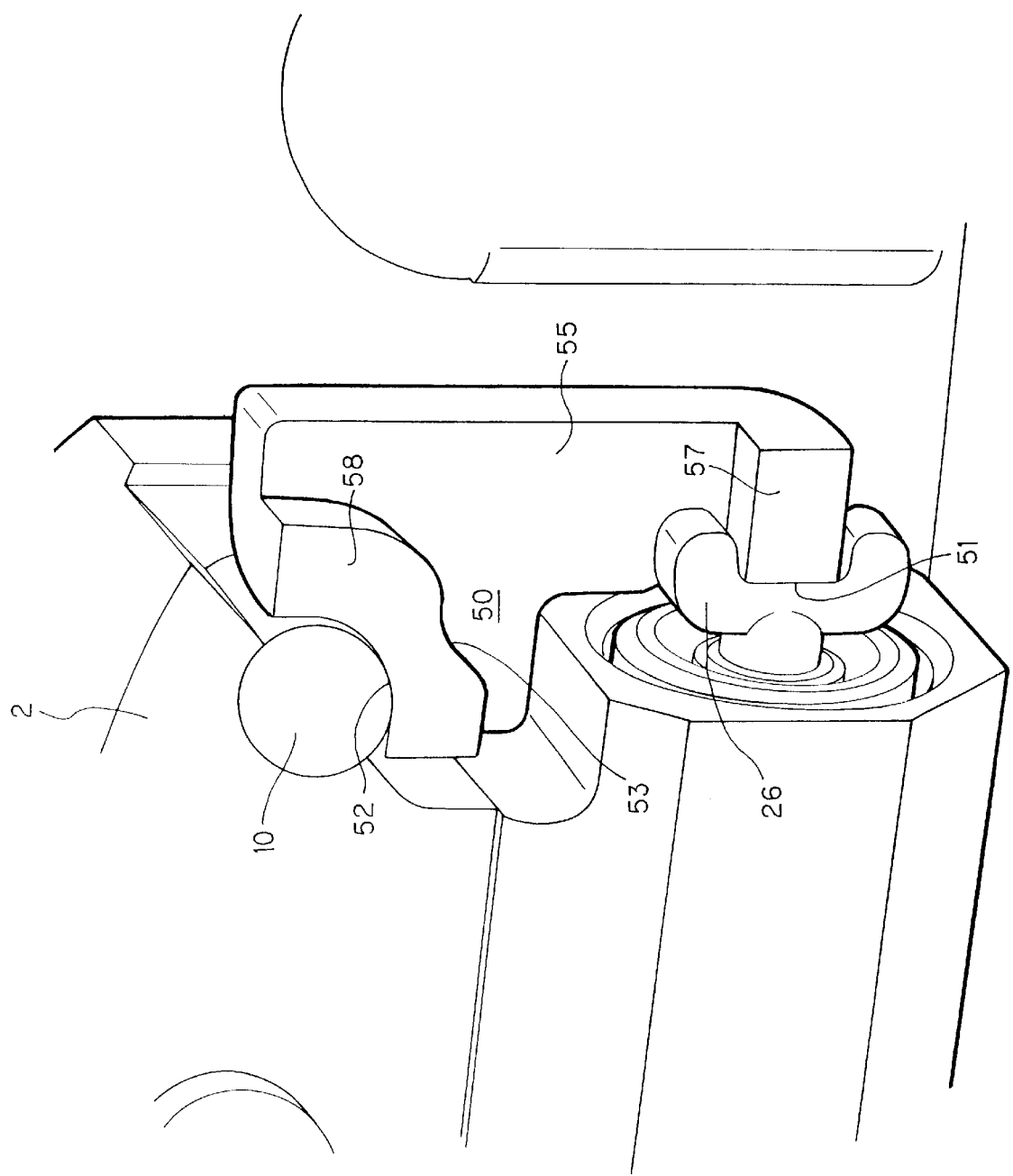
FIG. 2 is a perspective view showing a control lever of the brake device in FIG. 1 when viewed from the brake shoe.
Figure 3:
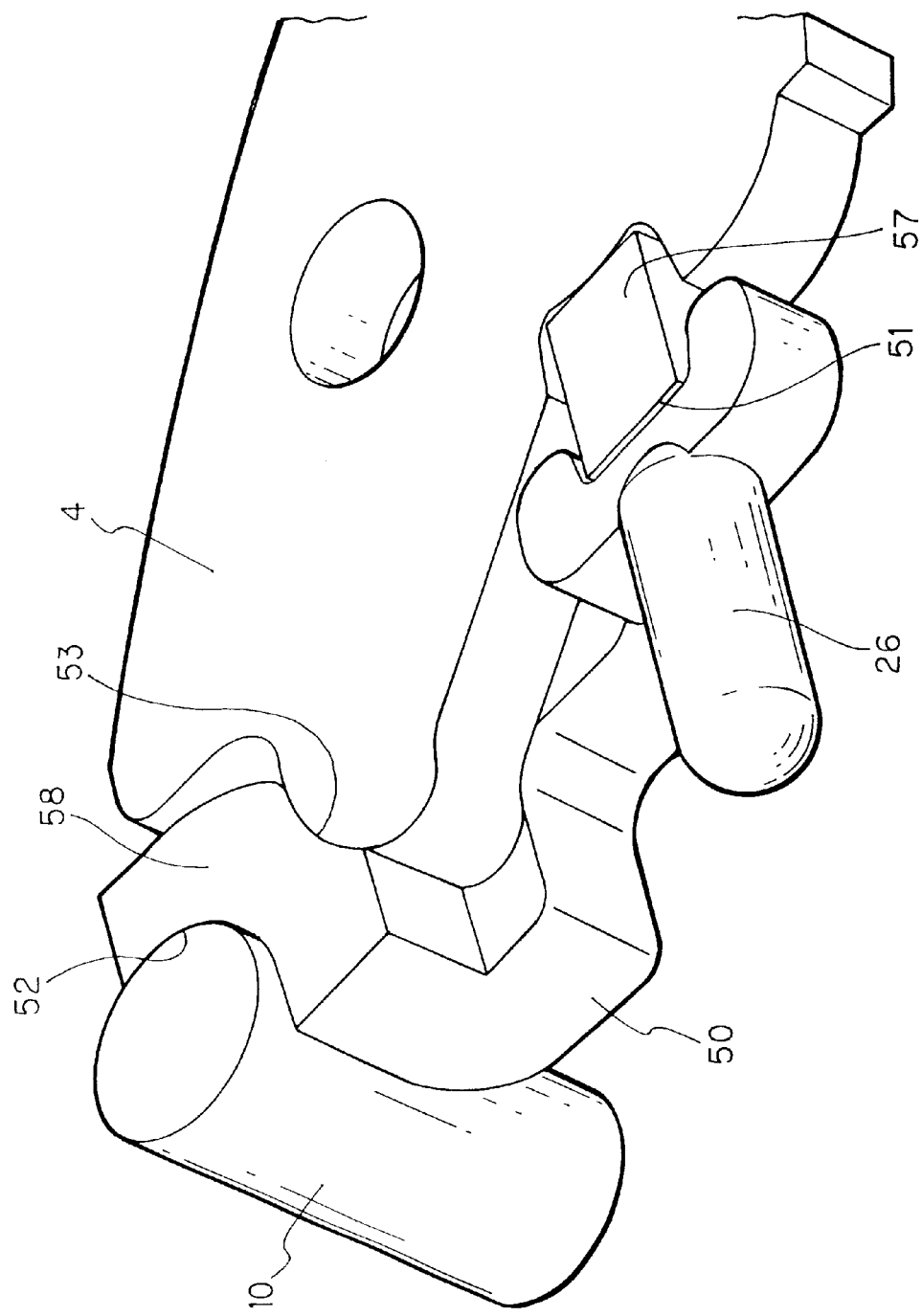
FIG. 3 is a perspective view of the control lever shown in the FIG. 2 when viewed from the wheel cylinder.

In the embodiment, as shown in FIGS. 2 and 3, the control lever 50 is constructed such that both ends of a plate-like lever body 55 thereof are raised to form first and second flanges 57 and 58. One side of the first flange 57 raised from one end of the lever body 55 is used as the piston contact portion 51. The second flange 58 is raised from the other end of the lever body 55. A surface of the second flange 58, which faces the anchor pin 10, is inwardly curved and used as the anchor contact portion 52 to be in contact with the anchor pin 10. Another surface of the second flange 58, which faces the end of the secondary shoe 4, is used as the shoe contact portion 53. The shoe contact portion 53 is inwardly curved.

The surface of the lever body 55 of the control lever 50 is substantially parallel to the surface of the secondary shoe 4. The control lever 50 is disposed between the wheel cylinder 2 and the secondary shoe 4 in a state that a part of the lever body 55 overlaps with the reverse side of the secondary shoe 4.

As described above, the control lever 50 used in the drum brake device 1 has such a simple structure that the flanges 57 and 58 are raised from both ends of the plate-like lever body 55. The first flange 57 is formed at one end of the plate-like lever body 55 and includes the piston contact portion 51. The second flange 58 including the anchor contact portion 52 and the shoe contact portion 53 is formed at the other end thereof and includes the anchor contact portion 52. Those flanges 57 and 58 may be formed by raising those ends of the lever body 55 by pressworking.

The control lever 50 may be formed by the pressworking suitable for mass production, not the cut working consuming much labor. This leads to reduction of cost to manufacture.

There is a case where the width of the lever body 55 of the control lever 50 is increased with the aim of increasing a mechanical strength of the control lever 50 so as to withstand the anchor counter force. Also in this, less limit is placed on the layout of the wheel cylinder 2 and the secondary shoe 4 since the lever body 55 is disposed such that it is parallel to the secondary shoe 4 while partially overlapping with the secondary shoe 4. The area occupied by the control lever 50 partially overlaps with that by the secondary shoe 4. Therefore, little reduction of the efficiency of the assembling work is made.

In operation, the control lever 50 receives at the shoe contact portion 53 of the lever body 55 an anchor counter force from the secondary shoe 4; it turns about the anchor contact portion 52 as a fulcrum; and the anchor counter force is transmitted, at a lever ratio, from its piston contact portion 51 to the control piston 21 by way of the piston rod 26 and the secondary piston 28.

When the control lever 50 is turned by an anchor counter force received, if a distance between the anchor contact portion 52 and the shoe contact portion 53 is large, an angle at which the anchor counter force of the secondary shoe 4 acts on a point on the control lever 50 varies in accordance with a quantity of a turn of the control lever 50. With the angle variation, the effective lever ratio varies and hence, a quantity of the anchor counter force distributed to the control piston 21 varies. This possibly makes the operation of the control lever 50 (caused by the anchor counter force) unstable, and degrades the control accuracy of the braking effect.

It is noted that where the control lever 50 is used, the distance L between the anchor contact portion 52 and the shoe contact portion 53 is approximately thickness of the second flange 58, i.e., extremely short. With this technical feature, even if the force acting point angle varies with the quantity of turn of the control lever 50, the effective lever ratio is kept substantially constant, viz., the distributed anchor counter force is little varied in quantity. Therefore, the operation of the control lever 50 caused by the anchor counter force is stable and the control accuracy of the braking effect is improved.

The configuration, layout and others of the piston contact portion 51, piston contact portion 51 and the shoe contact portion 53 of the control lever 50 are not limited to the illustrated and described ones.

The same thing is true for the construction of the wheel cylinder.

It is readily understood that the specific constructions on those portions 51 to 53 and the wheel cylinder 2 may appropriately be modified, altered and changed within the true spirits of the present invention.

The second embodiment of a drum brake device according to the present invention will be described with reference to the accompanying drawings from FIGS. 4 to 5.

Figure 4:
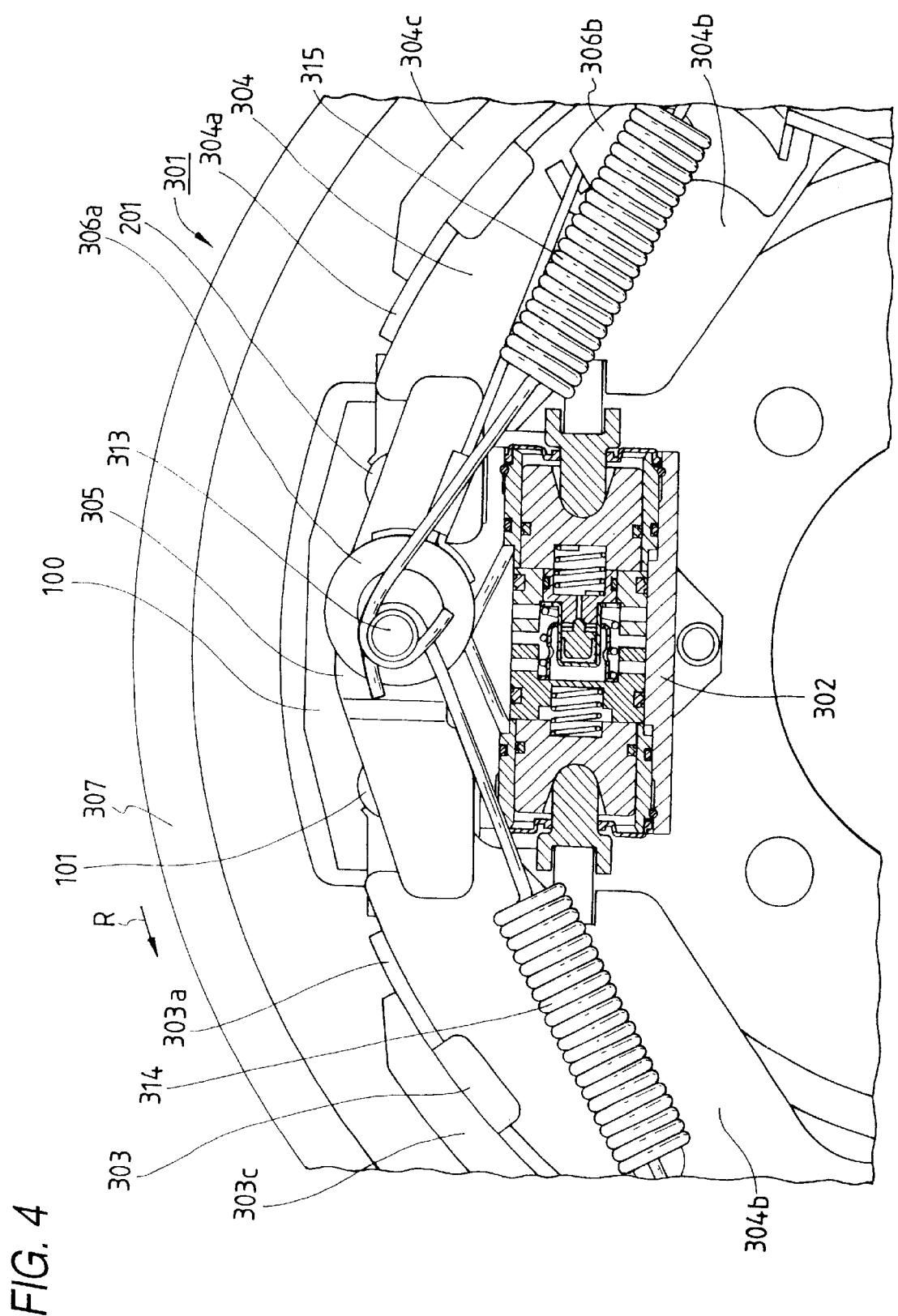
FIG. 4 is a plan view schematically showing a major portion of a second embodiment of a drum brake device according to the present invention.

FIG. 4 is a plan view schematically showing a major portion of an embodiment of a drum brake device according to the present invention. FIG. 5 is an enlarged, sectional view showing a wheel cylinder portion in the FIG. 4 drum brake device.

Figure 5:
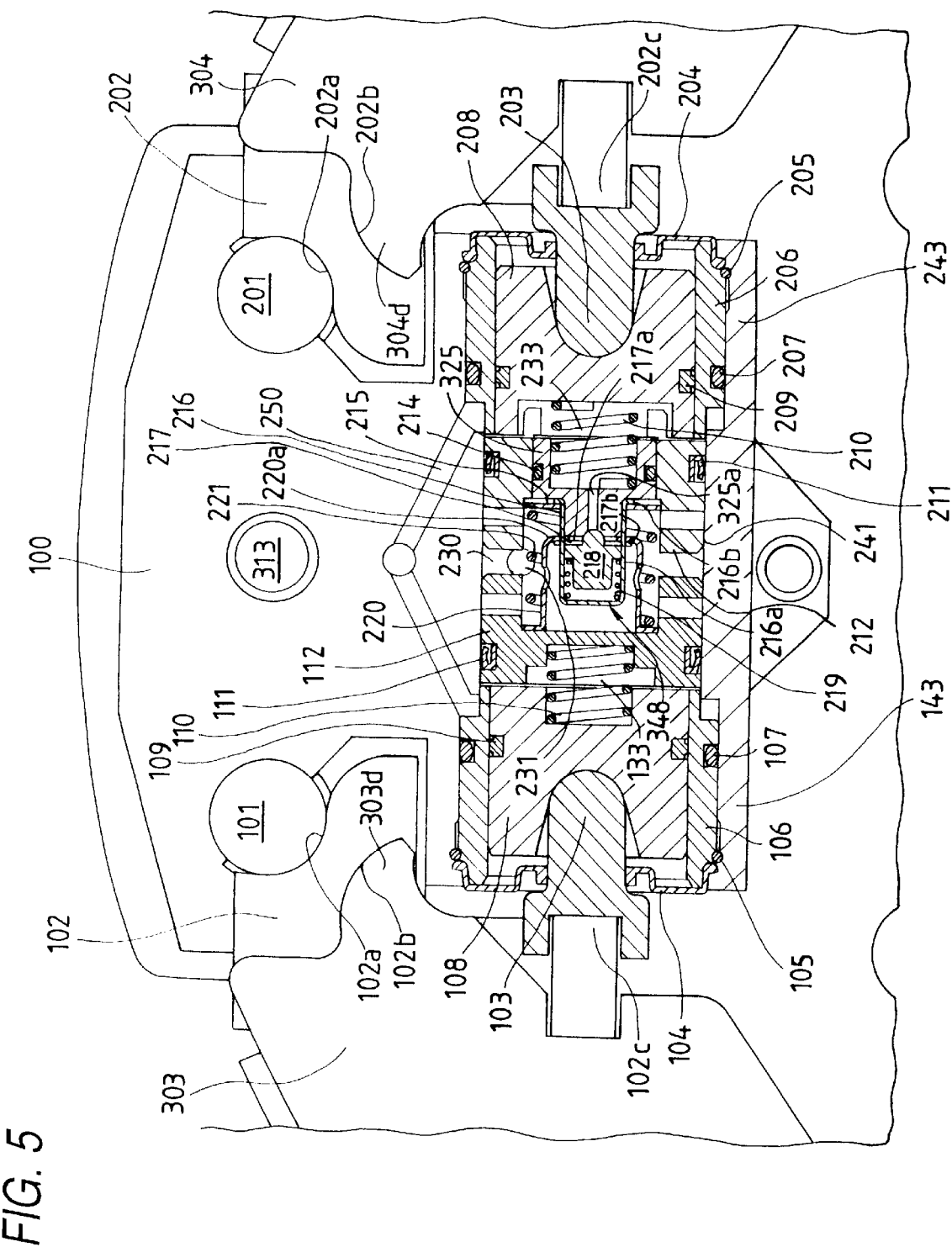
FIG. 5 is an enlarged, sectional view showing a wheel cylinder portion of the drum brake device shown in the FIG. 4.

A drum brake device 301 is made up of a pair of brake shoes, i.e., a primary shoe 303 and a secondary shoe 304, a wheel cylinder 302, an adjuster (not shown), a backing plate 307, and anchor pins 101 and 201 (FIG. 5). The pair of brake shoes 303 and 304 are oppositely disposed within the inner space of a cylindrical brake drum (not shown). The wheel cylinder 302 is disposed between first opposed ends of the brake shoes 303 and 304, and expands those brake shoes 303 and 304. The adjuster is disposed between the second opposed ends of the brake shoes 303 and 304, and serves as a link which receives an output power of the primary shoe 303 and inputs the power to the secondary shoe 304. The backing plate 307 supports those members. The anchor pins 101 and 201 are fastened on both sides of a cylinder body 100 of the wheel cylinder 302 (FIGS. 4 and 5).

The brake shoes 303 and 304 include rims 303a and 304a arcuately curved along the inner circumferential surface of the brake drum, webs 303b and 304b inwardly extended from the rims 303a and 304a, and linings 303c and 304c bonded to the outer periphery surface of the rims 303a and 304a. The brake shoes 303 and 304 are mounted on a backing plate 307 by means of support members (not shown), which pass through the webs 303b and 304b, such that those brake shoes are movable to and from the inner peripheral surface of the brake drum.

First opposed ends of the brake shoes 303 and 304, which are oppositely mounted on the backing plate 307, are engaged with the webs 303b and 304b thereof, while the second opposed ends of the brake shoes are urged so as to move to each other (i.e., in the directions apart from the brake drum) by means of shoe springs 314 and 315 coupled at one ends to a support shaft 313.

The support shaft 313, which is coupled to one ends of the shoe springs 314 and 315, passes through a wheel cylinder 100 and is fastened at one end to the backing plate 307. The support shaft 313 also supports a shoe plate 305 for preventing the brake shoes 303 and 304 from moving in axial direction of the wheel shaft.

A parking strut, a parking lever and others (those are not shown), which make up a parking brake mechanism, are also assembled to the backing plate 307. The parking lever is rotatably coupled to the backing plate 307 by a parking pin (not shown). When the parking lever is turned, the brake shoes 303 and 304 are also pressed against the brake drum.

In FIG. 4, an adjuster cable 306a the base of which is supported by the support shaft 313 is coupled to an adjuster lever (not shown) through a cable guide 306b, thereby urging the adjuster lever in a fixed direction.

The brake drum (not shown) is disposed coaxial with the backing plate 307. When a vehicle with the brake device assembled thereinto moves in the forward direction, the brake drum turns in the direction of an arrow R in FIG. 4.

The wheel cylinder 302 of the drum brake device 301, as shown in FIG. 5, is constructed such that a valve 348, a pair of control pistons 112 and 212, a pair of drive pistons 108 and 208, and others are assembled into the cylinder body 100.

The cylinder body 100 includes a control cylinder 241, a pair of drive cylinders 143 and 243, and a body-side passage 250. The control cylinder 241 holds the paired control pistons 112 and 212 in a state that these pistons are slidable in a direction (horizontal direction in FIG. 4) in which the brake shoes 303 and 304 are confronted with each other. The control cylinder 241 defines a control chamber 230 for supplying a hydraulic pressure derived from a master cylinder (not shown) in a region between the control pistons 112 and 212. The drive cylinders 143 and 243 are provided on both sides of the control cylinder 241 while communicating with the latter. The body-side passage 250 communicatively interconnects input chambers 133 and 233 respectively provided within the drive cylinders 143 and 243, and introduces a hydraulic pressure from one input chamber 133 to the other input chamber 233.

In the embodiment, the control cylinder 241 and the drive cylinders 143 and 243 are aligned substantially in line. Those cylinders form a piston accommodating hole, which passes through cylinder body 100 while ranging from one end thereof to the other end.

The drive cylinder 143 slidably holds the drive piston 108 for thrusting the primary shoe 303 with the aid of a cylindrical plug 106 fit into the drive cylinder.

The drive cylinder 243 slidably holds the drive piston 208 for thrusting the secondary shoe 304 with the aid of a cylindrical plug 206 fit into the drive cylinder.

Stop rings 105 and 205 fastened to locations closer to the openings of the drive cylinders 143 and 243 firmly hold the cylindrical plugs 106 and 206 so as to prevent them from slipping off, respectively. O-rings 107 and 207 are respectively fit to the grooves in the outer peripheral surfaces of the cylindrical plugs 106 and 206, thereby liquid tightly sealing the gaps present between the drive cylinders 143 and 243 and the cylindrical plugs 106 and 206.

The drive pistons 108 and 208 are located outside the control pistons 112 and 212 within the control cylinder 241, respectively. The drive cylinders 143 and 243 cooperate with the drive pistons 108 and 208 contained therein and the control pistons 112 and 212 located facing those drive pistons, to thereby define the input chambers 133 and 233.

Those input chambers 133 and 233 receive respectively the hydraulic pressure from the master cylinder through the control chamber 230, and displace the drive pistons 108 and 208 toward the related brake shoes.

Seals 109 and 209 are fit to grooves formed in the outer peripheral surfaces of the drive pistons 108 and 208, respectively. The seals 109 and 209 seal liquid tightly between pistons 108 and 208 and the cylindrical plugs 106 and 206, respectfully. Cup seals 111 and 211 are fit to sealing grooves formed in the outer peripheral surfaces of the control pistons 112 and 212. The cups seals 111 ans 211 seal liquid tightly between the control pistons 112 and 212, respectively and the control cylinder 241.

A valve seat 325 is slidably fit to a center position of the control piston 212, which is located closer to the secondary shoe 304 than the control piston 112. The valve seat 325 includes a hydraulic-pressure guide hole 325a. The hydraulic-pressure guide hole 325a sets up a communication between the control chamber 230 and the input chamber 233 closer to the secondary shoe 304.

The body-side passage 250 of the cylinder body communicatively connects the control chamber 230 to the input chamber 233 via the hydraulic-pressure guide hole 325a of the valve seat 325 (fit in the control piston 212) and the input chamber 133.

The control chamber 230 receives a hydraulic pressure originated from the master cylinder, through a fluid inlet 231 passing through the control cylinder 241.

Spring seats 220 and 215, respectively, are brought into contact with the inner end faces of the control pistons 112 and 212 in the control cylinder 241. A spring 221 is inserted between those spring seats 220 and 215 in a prepressed fashion. The spring 221 urges the control pistons 112 and 212 in the directions in which those pistons move apart from each other.

A spring 110 is inserted in prepressed fashion between the drive piston 108 closer to the primary shoe 303 and the control piston 112 located facing the input chamber 133. The spring 110 urges the drive piston 108 in the direction in which it moves apart from the control piston 112 (toward the primary shoe 303).

A spring 210 is inserted in prepressed fashion between the drive piston 208 closer to the secondary shoe 304 and the valve seat 325, which is located on the inner side of the control piston 212 while facing the input chamber 233. The spring 210 urges the drive piston 208 in the direction in which it moves apart from the control piston 212 (toward the secondary shoe 304).

The drive pistons 108 and 208, which are held by the drive cylinders 143 and 243, are brought into contact with the opposed ends of the brake shoes, with piston rods 103 and 203 and control levers 102 and 202 being interposed therebetween.

A dust boot 104 is provided between the piston rod 103 and the cylindrical plug 106. The dust boot 104 blocks entering of external foreign matters into the drive piston 108. A dust boot 204 is provided between the piston rod 203 and the cylindrical plug 206. The dust boot 204 blocks entering of external foreign matters into the drive piston 208.

The control levers 102 and 202 include pin contact portions 102a and 202a, shoe contact portions 102b and 202b, and rod contact portion 102c and 202c. The pin contact portions 102a and 202a, inwardly and arcuately curved, come in contact with the outer periphery surface of the anchor pins 101 and 201. The shoe contact portions 102b and 202b, inwardly and arcuately curved, come in contact with contact portions 303d and 304d, outwardly and arcuately curved, of the brake shoe and receives an anchor counter force from the brake shoe. The rod contact portions 102c and 202c come in contact with the piston rods 103 and 203.

The control levers 102 and 202 receive thrust generated by the drive pistons 108 and 208 when they receive hydraulic pressures supplied to the input chambers 133 and 233 via the piston rods 103 and 204, and transmit them to the related brake shoes 303 and 304. Further, they distribute anchor counter forces, which are applied from the brake shoes 303 and 304 to the control levers 102 and 202, to the anchor pins 101 and 201 and the drive pistons 108 and 208 at a predetermined lever ratio that depends on a distance between the contact portions.

The valve 348 is provided within the control chamber 230. The valve 348 closes the hydraulic-pressure guide hole 325a of the valve seat 325 when the drive pistons 108 and 208 operate, and the anchor counter forces derived from the drive pistons 108 and 208 act on the control pistons 112 and 212 by the operating fluid of the input chambers 133 and 233, and a distance between those pistons decreases to below a predetermined one.

Specifically, when either of the pair of control pistons 112 and 212 is displaced toward the control chamber 230 by the anchor counter force applied thereto and the distance between the control pistons 112 and 212 reduces to below a predetermined distance, a valve body 218 sits on the valve seat 325 holding the control piston 212, to thereby close the hydraulic-pressure guide hole 325a. In this state where the hydraulic-pressure guide hole 325a is closed with the valve body 218, the communication of the control chamber 230 with the input chamber 233 is blocked, and hence the supply of the hydraulic pressure from the control chamber 230 to the input chamber 133 is also stopped.

The valve body 218 is placed within a valve holder 216. the valve holder includes a guide tubular portion 216a with the bottom which contains the secondary piston 328 slidably in the cylinder axial direction, and a collar portion 216b radially extending from the open end of the guide tubular portion 216a and sandwiched between the spring seat 215 and the valve seat 325.

Within the valve holder 216, the valve body 218 is urged toward the valve seat 325 by a spring 219, which is resiliently inserted between the inner bottom surface of the valve holder 216 and the valve body 218. Normally, its movement toward the valve seat 325 is blocked with a plate 217.

The plate 217 includes a ring portion 217a and an engaging piece 217b. The ring portion 217a is brought into contact with the periphery of a spherical part 218a of the tip of the valve body 218. The engaging piece 217b is radially and outwardly protruded from the outer periphery of the ring portion 217a. The engaging piece 217b passes through a slit (not shown) formed in the guide tubular portion 216a of the valve holder 216 and is protruded out of the valve holder 216, and is brought into engagement with a collar portion 220a which is located at the top of the cylindrical spring seat 220 surrounding the valve holder 216, whereby its movement toward the valve seat 325 is blocked. With this structure, when the spring 219 is compressed, the valve body 218 is movable to the inner bottom of the valve holder 216. However, it cannot move beyond the position of the collar portion 220a of the spring seat 220 when it moves to the open end of the valve holder 216.

When the drum brake device 301 provided with the thus constructed wheel cylinder 302 operates during the forward brake application, a hydraulic pressure is applied from the master cylinder to the input chambers 133 and 233 via a route of the control chamber 230, the hydraulic-pressure guide hole 325a and the body-side passage 250, and it causes the drive pistons 108 and 208 of the drive cylinders 143 and 243 to expand the paired brake shoes 303 and 304 into engagement with the inner surface of the brake drum. In this case, the anchor counter force acting on the primary shoe 303 is input to the input of the secondary shoe 304 to press the secondary shoe 304 against the inner surface of the secondary shoe 304. Therefore, the brake shoes 303 and 304 serve as a leading shoe, and the brake device produces a braking force at considerably high gain.

During this forward brake application, the anchor counter force of the secondary shoe 304 acts on the drive piston 208 for the secondary shoe 304 with the aid of the control lever 202. The anchor counter force acting on the drive piston 208 acts on the control piston 212 by the operating fluid of the input chamber 233. When the anchor counter force acting on the control piston 212 increases to reach a predetermined magnification ratio and exceeds a hydraulic pressure within the control chamber 230 which acts on the control piston 212. At this time, the control piston 212 is displaced toward the control chamber 230 to decrease the distance between the control pistons 112 and 212 to below a predetermined one. Then, the valve body 218 of the valve 348 within the control chamber 230 closes the hydraulic-pressure guide hole 325a in the control piston 212 to block the communication between the control chamber 230 and the input chamber 233. Therefore, the supply of the hydraulic pressure from the control chamber 230 to the input chamber 133 is also stopped. Therefore, the drum brake device stabilizes the braking effect while retaining a predetermined magnification ratio against the hydraulic pressure applied from the master cylinder.

Also during the reverse brake application, a hydraulic pressure is supplied from the master cylinder to the input chambers 133 and 233 via the control chamber 230, the hydraulic-pressure guide hole 325a and the body-side passage 250. The hydraulic pressure causes the drive pistons 108 and 208 of the drive cylinders 143 and 243 to expand the brake shoes 303 and 304 into engagement with the inner surface of the brake drum. During the reverse brake application, the anchor counter force of the secondary shoe 304 is input as an input power to the primary shoe 303, to thereby produce braking effect at high gain.

The drive pistons 108 and 208 are brought into contact with the brake shoes 303 and 304 by the control levers 102 and 202, respectively. Therefore, during the reverse brake application, as during the forward brake application, the anchor counter force of the primary shoe 303 acts on the control piston 112 by the drive piston 108 and the operating fluid within the input chamber 133. When the anchor counter force acting on the control piston 112 is increased to a predetermined magnification ratio and exceeds the hydraulic pressure within the control chamber 230 which acts on the control piston 112, the control piston 112 is displaced toward the control chamber 230 and the distance between the control pistons 112 and 212 is reduced to below a predetermined one. At this time, the valve body 218 of the valve 348 within the control chamber 230 closes the hydraulic-pressure guide hole 325a in the control piston 212 to block the communication between the control chamber 230 and the input chamber 233. Therefore, the supply of the hydraulic pressure from the control chamber 230 to the input chamber 133 is also stopped.

Therefore, the drum brake device stabilizes the braking effect while retaining a predetermined magnification ratio against the hydraulic pressure applied from the master cylinder.

As seen from the above description, the invention succeeds in providing a drum brake device which can stabilize the braking effect in both the forward and reverse rotation directions of the brake drum.

In the embodiment, the control cylinder 241 and the drive cylinders 143 and 243 are aligned substantially in line. Those cylinders forms a piston accommodating hole, which passes through cylinder body 100 while ranging from one end thereof to the other end. Therefore, the work to manufacture those cylinders is easy.

In the embodiment, the pair of control pistons 112 and 212 are used for the control cylinder 241 for the control of the anchor counter force during the forward brake application and that during the reverse brake application. The valve 348, located between the pair of control pistons 112 and 212 is used for both the forward and reverse brake applications. This contributes to reduction of the number of required component parts.

In the drum brake device constructed according to the first embodiment of the present invention, the control lever has such a simple structure that both ends of a plate-like lever body thereof are raised to form first and second flanges. Those flanges may be formed by raising those ends of the lever body by pressworking. The control lever may be formed by the pressworking suitable for mass production. This leads to reduction of cost to manufacture.

In case where the width of the lever body of the control lever is increased with the aim of increasing a mechanical strength of the control lever so as to withstand the anchor counter force, less limit is placed on the layout of the wheel cylinder and the secondary shoe since the lever body is disposed such that it is parallel to the secondary shoe while partially overlapping with the secondary shoe. The area occupied by the control lever partially overlaps with that by the secondary shoe. Therefore, little reduction of the efficiency of the assembling work is made.

Where the control lever is used, the distance between the anchor contact portion and the shoe contact portion is approximately thickness of the second flange, i.e., extremely short. With this technical feature, even if the force acting point angle varies with the quantity of turn of the control lever, the effective lever ratio is kept substantially constant, viz., the distributed anchor counter force is little varied in quantity.

Therefore, the operation of the control lever caused by the anchor counter force is stable and the control accuracy of the braking effect is improved.

According to the second embodiment of the invention, when the drum brake device provided with the thus constructed wheel cylinder operates during the forward brake application, a hydraulic pressure is applied from the master cylinder to the input chambers via a route of the control chamber, the hydraulic-pressure guide hole and the body-side passage, and it causes the drive pistons of the drive cylinders to expand the paired brake shoes into engagement with the inner surface of the brake drum. In this case, the anchor counter force acting on the primary shoe is input to the input of the secondary shoe to press the secondary shoe against the inner surface of the secondary shoe. Therefore, the brake shoes serve as a leading shoe, and the brake device produces a braking force at considerably high gain.

During this forward brake application, the anchor counter force of the secondary shoe acts on the drive piston for the secondary shoe with the aid of the control lever. The anchor counter force acting on the drive piston acts on the control piston by the operating fluid of the input chamber. When the anchor counter force acting on the control piston increases to reach a predetermined magnification ratio and exceeds a hydraulic pressure within the control chamber which acts on the control piston. At this time, the control piston is displaced toward the control chamber to decrease the distance between the control pistons to below a predetermined one. Then, the valve body of the valve within the control chamber closes the hydraulic-pressure guide hole in the control piston to stop the supply of the hydraulic pressure from the control chamber to the input chamber. Therefore, the drum brake device stabilizes the braking effect while retaining a predetermined magnification ratio against the hydraulic pressure applied from the master cylinder.

Also during the reverse brake application, a hydraulic pressure is supplied from the master cylinder to the input chambers via the control chamber, the hydraulic-pressure guide hole and the body-side passage. The hydraulic pressure causes the drive pistons of the drive cylinders to expand the brake shoes into engagement with the inner surface of the brake drum. During the reverse brake application, the anchor counter force of the secondary shoe is input as an input power to the primary shoe, to thereby produce braking effect at high gain.

The drive pistons are brought into contact with the brake shoes by the control levers, respectively. Therefore, during the reverse brake application, as during the forward brake application, the anchor counter force of the primary shoe acts on the control piston by the drive piston and the operating fluid within the input chamber. When the anchor counter force acting on the control piston is increased to a predetermined magnification ratio and exceeds the hydraulic pressure within the control chamber which acts on the control piston, the control piston is displaced toward the control chamber and the distance between the control pistons is reduced to below a predetermined one. At this time, the valve body of the valve within the control chamber closes the hydraulic-pressure guide hole in the control piston to stop the supply of the hydraulic pressure from the control chamber to the input chamber. Therefore, the drum brake device stabilizes the braking effect while retaining a predetermined magnification ratio against the hydraulic pressure applied from the master cylinder.

Therefore, invention provides a drum brake device which can stabilize the braking effect in both the forward and reverse rotation directions of the brake drum. The drum brake device of the invention is capable of stabilizing the braking effect in particular during the reverse brake application as well as during the forward brake application. Therefore, the drum brake device of the invention may be effective also when it is applied to special vehicles, e.g., a fork lift truck, of the type in which little difference of braking force is present between the forward and reverse brake applications.

In the embodiment, the control cylinder and the drive cylinders are aligned substantially in line. Those cylinders forms a piston accommodating hole, which passes through cylinder body while ranging from one end thereof to the other end. Therefore, the work to manufacture those cylinders is easy.

In the embodiment, the pair of control pistons are used for the control cylinder for the control of the anchor counter force during the forward brake application and that during the reverse brake application. The valve, located between the pair of control pistons is used for both the forward and reverse brake applications. This contributes to reduction of the number of required component parts.

While only certain embodiments of the invention have been specifically described herein, it will be apparent that numerous modifications may be made thereto without departing from the spirit and scope of the invention.

The present invention is based on Japanese Patent Applications No. Hei. 10-129087 and No. Hei. 10-195937, which are incorporated herein by references.

What is claimed is:

1. A drum brake device comprising:

a primary brake shoe and a secondary brake shoe oppositely disposed within an inner space of a brake drum;

a wheel cylinder disposed between first opposed ends of said brake shoes, said wheel cylinder comprisinig a drive piston for pressing said brake shoes in accordance with a hydraulic pressure supplied to a pressure chamber, and a control piston for controlling the supply of the hydraulic pressure to said pressure chamber;

anchor pins provided in said wheel cylinder and receiving anchor counter forces from said brake shoes; and a control lever including a piston contact portion at one end thereof, an anchor contact portion at the other end, and a shoe contact portion at a mid position, said control lever distributing an anchor counter force to one of said anchor pins and said control piston, wherein said control lever includes first and second flanges formed by respectively raising both ends of a plate, wherein one side of said first flange is used as said piston contact portion, wherein said second flange includes first and second surfaces, said first surface faces one of said anchor pins and is used as said anchor contact portion, and said second surface faces the first opposed end of said secondary brake shoe and is used as said shoe contact portion, and wherein said control lever is disposed between said wheel cylinder and said secondary brake shoe.

2. The drum brake device according to claim 1, wherein said first and second flanges are formed by pressworking.

3. The drum brake device according to claim 1, wherein said first surface of said second flange is formed in a substantially arc-shape with a curve along with said anchor pin.

4. The drum brake device according to claim 1, wherein a distance between said anchor contact portion and said shoe contact portion is approximately the same as a thickness of said second flange.

5. The drum brake device according to claim 1, wherein said lever body partially overlaps with said secondary brake shoe and shares space disposing both.

6. A drum brake device comprising:

a pair of brake shoes oppositely disposed within an inner space of a brake drum; and a wheel cylinder for expanding said brake shoes, wherein a cylinder body of said drum brake device includes:

a control cylinder slidably holding a pair of control pistons in a region between said brake shoes, and defining a control chamber for supplying a hydraulic pressure derived from a master cylinder in a region between said control pistons;

a pair of drive cylinders, communicating with said control cylinder, holding drive pistons provided outside said control pistons slidable in a direction which said brake shoes are confronted with each other; and a body-side passage for communicatively interconnecting said control chamber to input chambers through a hydraulic-pressure guide hole passing through one of said control pistons, wherein said drive pistons are abutted against said opposed brake shoes through control levers, and an anchor counter force of each said brake shoe is distributed at a predetermined lever ratio to an anchor pin and said drive pistons through said control lever, wherein a valve is provided within said control chamber and closes said hydraulic-pressure guide hole when said control pistons are displaced to said control chamber by anchor counter forces applied from said drive pistons to said control pistons by operating fluid of said input chambers, and a distance between said control pistons decreases to below a predetermined value.

7. The drum brake device according to claim 6, wherein said valve is used in both forward and reverse brake modes.

* * * * *